(12) United States Patent
Rieschick et al.

(10) Patent No.: US 8,306,530 B1
(45) Date of Patent: Nov. 6, 2012

(54) METHOD AND SYSTEM FOR ASSIGNING A STATIC MOBILE INTERNET PROTOCOL ADDRESS TO A MOBILE NODE

(75) Inventors: Gary Joel Rieschick, Louisburg, KS (US); Kent DeLancy Mabee, San Diego, CA (US); Troy Alexander Wilson, Lenexa, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 782 days.

(21) Appl. No.: 12/245,314

(22) Filed: Oct. 3, 2008

(51) Int. Cl.
*H04W 4/00* (2009.01)

(52) U.S. Cl. .................. 455/435.1; 455/432.1; 370/328; 370/338; 709/245

(58) Field of Classification Search .................. 370/328, 370/338; 455/432.1, 435.1; 709/245
See application file for complete search history.

(56) References Cited

U.S. PATENT DOCUMENTS

| | | | |
|---|---|---|---|
| 7,058,059 B1 | 6/2006 | Henry et al. | |
| 7,277,416 B1 * | 10/2007 | Chang et al. | 370/338 |
| 2004/0153525 A1 * | 8/2004 | Borella | 709/217 |
| 2004/0208153 A1 * | 10/2004 | Mizell et al. | 370/338 |
| 2005/0136920 A1 * | 6/2005 | Rink et al. | 455/433 |
| 2005/0147069 A1 * | 7/2005 | Rink et al. | 370/338 |
| 2006/0153063 A1 * | 7/2006 | Islam et al. | 370/216 |
| 2007/0094709 A1 * | 4/2007 | Hsu | 726/2 |
| 2007/0153787 A1 | 7/2007 | Wang | |
| 2007/0268874 A1 | 11/2007 | Vare et al. | |

* cited by examiner

*Primary Examiner* — Rafael Pérez-Gutiérrez
*Assistant Examiner* — Liton Miah

(57) ABSTRACT

A method for assigning a static mobile internet protocol address to a mobile node by an access node is provided. The method includes receiving a mobile registration request message, sending an access request message to an authorization node in response to the registration request, and receiving an access accept message containing a static mobile IP address from the authorization node. The method continues by sending an access registration request message containing the static mobile IP address to a mobile network internet node, which then assigns the static mobile IP address to the mobile node. A mobile access registration request message associated with the mobile registration request message is sent to the mobile network internet node at a time after the access registration request message has been sent. A mobile access registration reply message is received from the mobile network internet node, and a mobile reply registration message containing the static mobile IP address is sent to the mobile node.

10 Claims, 4 Drawing Sheets

METHOD AND SYSTEM FOR ASSIGNING A STATIC MOBILE INTERNET PROTOCOL ADDRESS TO A MOBILE NODE

TECHNICAL BACKGROUND

In a mobile Internet Protocol (IP) communication network, mobile nodes communicate through the Internet. Each mobile node requires an IP address for this communication so that it may receive messages. Typically mobile nodes are assigned dynamic IP addresses for this communication.

Current methods for assigning a static mobile IP address to the mobile node require extensive communication between a home or foreign agent and the authentication, authorization, and accounting (AAA) system servicing the mobile node. The AAA system stores static mobile IP addresses for mobile nodes and must be accessed by each home or foreign agent as the mobile node moves throughout the communication network.

OVERVIEW

In an embodiment, a method is provided for assigning a static mobile internet protocol address to a mobile node by an access node. The method includes receiving a mobile registration request message at the access node transferred from a mobile node, and sending an access request message to an authorization node, in response to the registration request. The method continues by receiving an access accept message from the authorization node in response to the access request message, where the access accept message includes a static mobile internet protocol address associated with the mobile node.

The method then continues by sending an access registration request message to a mobile network internet node, where the access registration request message includes the static mobile internet protocol address. The method also assigns the mobile node the static mobile internet protocol address at the mobile network internet node, and sends a mobile access registration request message associated with the mobile registration request message to the mobile network internet node at a time after the access registration request message has been sent.

The method continues by receiving a mobile access registration reply message at the access node transferred from the mobile network internet node, where the mobile access registration reply message includes the static mobile internet protocol address, and sending a mobile reply registration message to the mobile node transferred from the access node, where the mobile reply registration message includes the static mobile internet protocol address.

In another embodiment, a communication system for assigning a static mobile internet protocol address to a mobile node includes a radio network, a mobile node coupled to the radio network, an access node coupled to the radio network, an authorization node coupled to the access node, and a mobile network internet node coupled to the access node.

The mobile node is configured to send a mobile registration request message to the access node, and receive a mobile reply registration message from the access node.

The access node is configured to receive a mobile registration request message transferred from the mobile node, send an access request message to the authorization node, in response to the registration request, and to receive an access accept message from the authorization node in response to the access request message, where the access accept message includes a static mobile internet protocol address associated with the mobile node.

The access node is also configured to send an access registration request message to the mobile network internet node, where the access registration request message includes the static mobile internet protocol address, and where the mobile network internet node is configured to assign the mobile node the static mobile internet protocol address.

The access node is further configured to send a mobile access registration request message associated with the mobile registration request message to the mobile network internet node at a time after the access registration request message has been sent, and to receive a mobile access registration reply message transferred from the mobile network internet node, where the mobile access registration reply message includes the static mobile internet protocol address.

The access node is also configured to send a mobile reply registration message to the mobile node, where the mobile reply registration message includes the static mobile internet protocol address.

The authorization node is configured to receive an access request message from the access node, and to send an access accept message to the access node in response to the access request message.

The mobile network internet node is configured to receive an access registration request message from the access node, where the access registration request message includes the static mobile internet protocol address, assign the mobile node the static mobile internet protocol address, and to send a mobile access registration reply message to the access node, where the mobile access registration reply message includes the static mobile internet protocol address.

DETAILED DESCRIPTION

Figure 1:
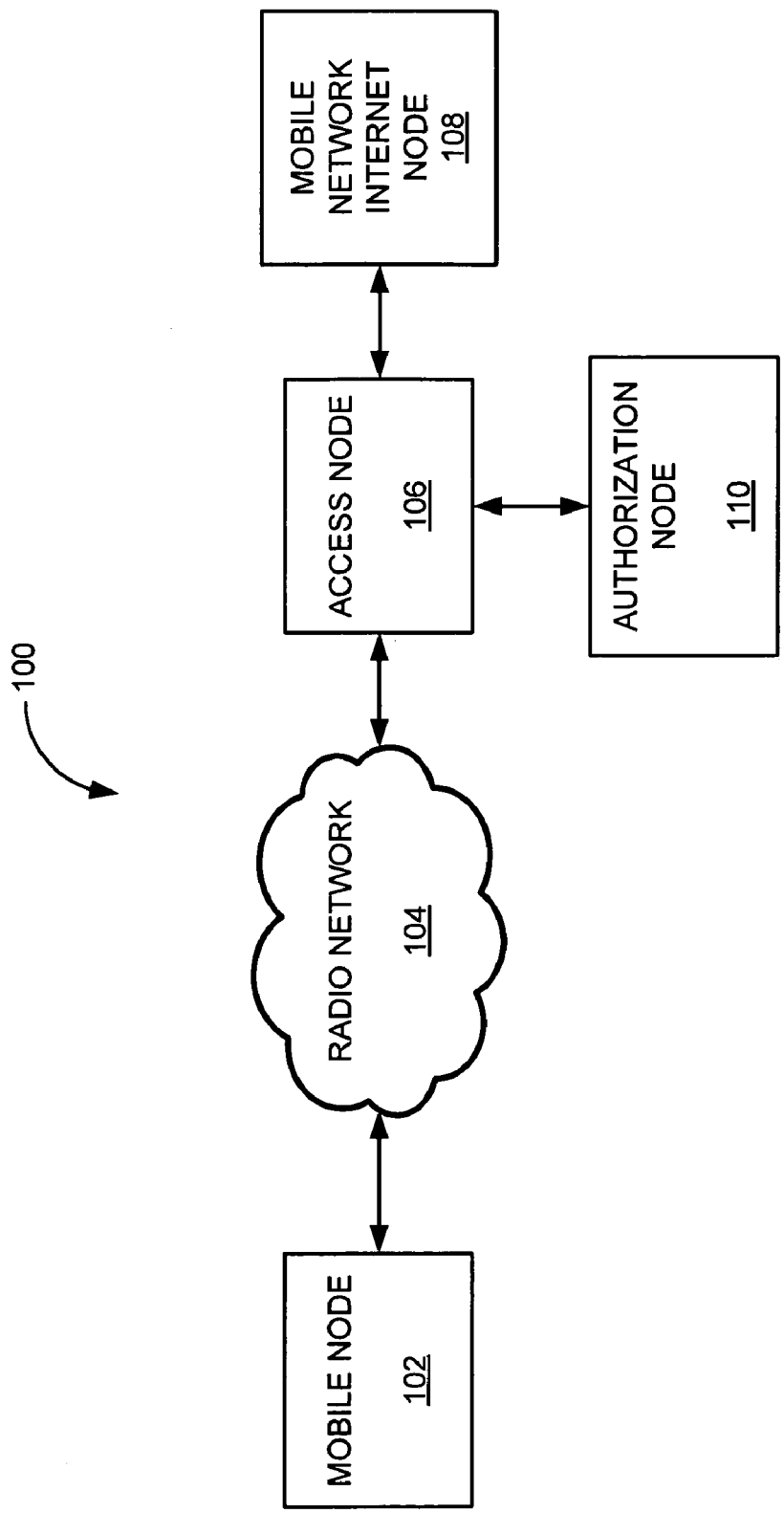
FIG. 1 is a block diagram illustrating a communication system configured to assign a static mobile internet protocol address to a mobile node.

FIG. 1 is a block diagram illustrating a communication system configured to assign a static mobile internet protocol address to a mobile node. In this embodiment, communication system 100 includes mobile node 102, radio network 104, access node 106, mobile network internet node 108, and authorization node 110.

Mobile node 102 communicates with access node 106 through radio network 104. Access node 106 is communicatively coupled with mobile network internet node 108, authorization node 110, and radio network 104 through a plurality of links.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Access node 106 may be any of a variety of communication devices such as an access gateway, an access services network gateway (ASN-GW), a mobile station controller (MSC), a base station controller (BSC), a packet data serving node (PDSN), and the like. Mobile network internet node 108 may be any of a variety of communication system devices configured to provide internet protocol addresses for mobile nodes. It includes account settings for mobile node 102 and may include a database of dynamic internet protocol addresses for use by mobile node 102.

Authorization node 110 may be any of a variety of communication system devices such as an authentication, authorization, and accounting (AAA) system, or the like. Authorization node 110 stores static internet protocol addresses for use by mobile node 102. It is desirable to assign a static internet protocol addresses to mobile node 102 so that its address does not change while mobile node 102 moves throughout a communication system.

When mobile node 102 starts an internet protocol session it sends a mobile registration request message to access node 106 through radio network 104. Normally, access node 106 would send a mobile access registration request message to mobile network internet node 108 in response to this registration request message. This mobile access registration request message would not include any IP address for mobile node 102 and mobile network internet node 108 would assign a dynamic IP address to mobile node 102 in response to this message.

In order to assign a static IP address to mobile node 102, access node 106 sends an access request message to authorization node 110 requesting a static IP address for assignment to mobile node 102 before sending the mobile access registration request message to mobile network internet node 108. Authorization node 110 responds by sending an access accept message to access node 106. The access accept message includes a static mobile IP address for mobile node 102.

Once access node 106 receives the access accept message from authorization node 110, it sends an access registration request message to mobile network internet node 108 containing the static mobile IP address for mobile node 102. Mobile network internet node 108 then creates a binding for this internet session for mobile node 102 including the static mobile IP address. Mobile network internet node 108 then sends a mobile access registration reply message to access node 106 containing the static mobile IP address. Access node 106 then sends a mobile reply registration message to mobile node 102 containing the static mobile IP address for use in the current internet session regardless of where mobile node 102 travels.

After sending the access registration request message containing the static mobile IP address to mobile network internet node 108, access node 106 then sends the normal mobile access registration request message to mobile network internet node 108. This normal mobile access registration request message does not contain an IP address for mobile node 102. Since mobile network internet node 108 has already created a binding for mobile node 102 including the static mobile IP address before the mobile access registration request message arrives, it ignores the mobile access registration request message.

Access node 106 sends the access registration request message to mobile network internet node 108 some period of time before it sends the mobile access registration request message. This period of time must be sufficient to ensure that the access registration request message arrives at the mobile network internet node 108 prior to the mobile access registration request message. If the mobile access registration request message arrives first, mobile network internet node 108 will create a binding for mobile node 102 containing a dynamic IP address and will ignore the access registration request message containing the static mobile IP address when it arrives. This sequencing of messages may be performed using any of a variety of methods. For example, access node 106 may wait a fixed period of time between sending the two messages.

Figure 2:
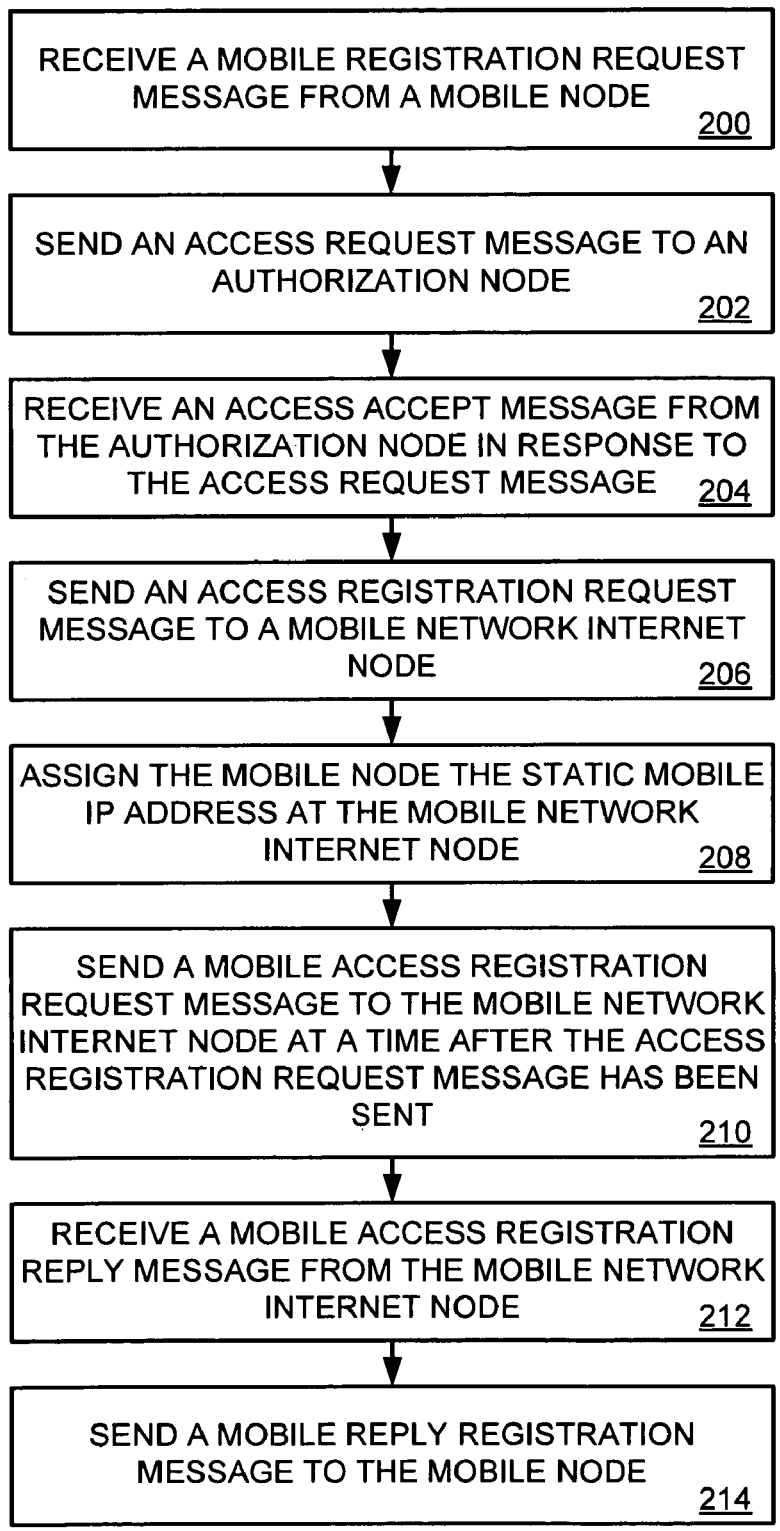
FIG. 2 is a flow diagram illustrating a method for assigning a static mobile internet protocol address to a mobile node.

FIG. 2 is a flow diagram illustrating a method for assigning a static mobile internet protocol address to a mobile node. In this example, an access node receives a mobile registration request message from a mobile node (operation 200). The mobile node may be in the process of traveling throughout the communication system. It is desirable to assign a static mobile IP address to the mobile node for the duration of its internet session.

The access node sends an access request message to an authorization node (operation 202). In response to the access request message, the authorization node sends an access accept message containing a static mobile IP address for the mobile node to the access node (operation 204).

Once the access node has received the access accept message and the static mobile IP address, it sends an access registration request message to a mobile network internet node (operation 206). The access registration request message contains the static mobile IP address assigned to the mobile node.

In response to the access registration request message, the mobile network internet node creates a binding for the mobile node assigning the static mobile IP address to the mobile node (operation 208). The access node then sends a mobile access registration request message to the mobile network internet node at some time after the access registration request message has been sent (operation 210).

The mobile network internet node sends a mobile access registration reply message containing the static mobile IP address to the access node (operation 212). Finally the access node sends a mobile reply registration message containing the static mobile IP address to the mobile node for use throughout the internet session regardless of where the mobile node travels during the session (operation 214).

Figure 3:
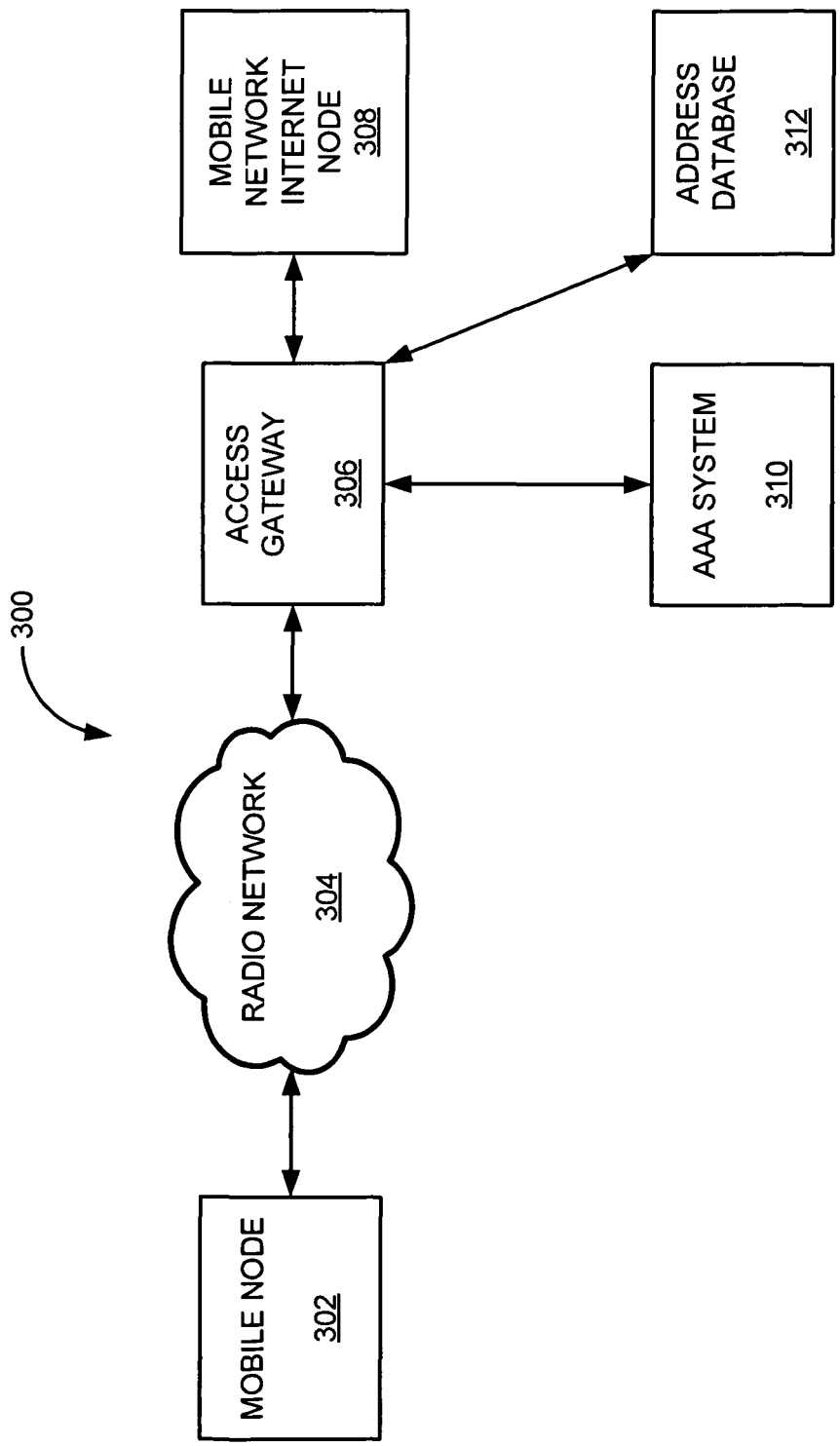
FIG. 3 is a block diagram illustrating a communication system configured to assign a static mobile internet protocol address to a mobile node.

FIG. 3 is a block diagram illustrating a communication system configured to assign a static mobile internet protocol address to a mobile node. In this embodiment, communication system 300 includes mobile node 302, radio network 304, access gateway 306, mobile network internet node 308, authentication, authorization, and accounting (AAA) system 310, and address database 312.

Mobile node 302 communicates with access gateway 306 through radio network 304. Access gateway 306 is communicatively coupled with mobile network internet node 308, AAA system 310, address database 312, and radio network 304 through a plurality of links.

These links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, code division multiple access, worldwide interoperability for microwave access, or any other communication protocols and formats, including combinations thereof. Further, the links could be direct links or they might include various intermediate components, systems, and networks.

Mobile network internet node 108 may be any of a variety of communication system devices configured to provide internet protocol addresses for mobile nodes. It includes account settings for mobile node 102. In this embodiment, a separate address database 312 containing dynamic IP addresses is provided.

AAA system 310 stores static internet protocol addresses for use by mobile node 302. It is desirable to assign a static internet protocol addresses to mobile node 302 so that its address does not change while mobile node 302 moves throughout a communication system.

When mobile node 302 starts an internet protocol session it sends a mobile registration request message to access gateway 306 through radio network 304. Normally, access gateway 306 would send a mobile access registration request message to mobile network internet node 308 in response to this registration request message. This mobile access registration request message would not include any IP address for mobile node 302 and mobile network internet node 308 would assign a dynamic IP address from address database 312 to mobile node 302 in response to this message.

In order to assign a static IP address to mobile node 302, access gateway 306 sends an access request message to AAA system 310 requesting a static IP address for assignment to mobile node 302 before sending the mobile access registration request message to mobile network internet node 108. AAA system 310 responds by sending an access accept message to access gateway 306. The access accept message includes a static mobile IP address for mobile node 302.

Once access gateway 306 receives the access accept message from AAA system 310, it sends an access registration request message to mobile network internet node 308 containing the static mobile IP address for mobile node 302. Mobile network internet node 308 creates a binding for this internet session for mobile node 302 including the static mobile IP address. Mobile network internet node 308 sends a mobile access registration reply message to access gateway 306 containing the static mobile IP address. Access gateway 306 sends a mobile reply registration message to mobile node 302 containing the static mobile IP address for use in the current internet session regardless of where mobile node 102 travels.

After sending the access registration request message containing the static mobile IP address to mobile network internet node 308, access gateway 306 then sends the normal mobile access registration request message to mobile network internet node 308. This normal mobile access registration request message does not contain an IP address for mobile node 302. Since mobile network internet node 308 has already created a binding for mobile node 302 including the static mobile IP address before the mobile access registration request message arrives, it ignores the mobile access registration request message.

Access gateway 306 sends the access registration request message to mobile network internet node 308 some period of time before it sends the mobile access registration request message. This period of time must be sufficient to ensure that the access registration request message arrives at the mobile network internet node 308 prior to the mobile access registration request message. If the mobile access registration request message arrives first, mobile network internet node 308 will create a binding for mobile node 302 containing a dynamic IP address and will ignore the access registration request message containing the static mobile IP address when it arrives. This sequencing of messages may be performed using any of a variety of methods. For example, access gateway 306 may wait a fixed period of time between sending the two messages.

The methods, systems, devices, processors, equipment, and servers described above may be implemented with, contain, or be executed by one or more computer systems. The methods described above may also be stored on a computer readable medium for execution by a computer system. Many of the elements of communication systems 100 and 300 may be, comprise, or include computer systems. This includes, but is not limited to access node 106, authorization node 110, mobile network internet node 108, access gateway 306, AAA system 310, mobile network internet node 308, and address database 312. These computer systems are illustrated, by way of example, in FIG. 4.

Figure 4:
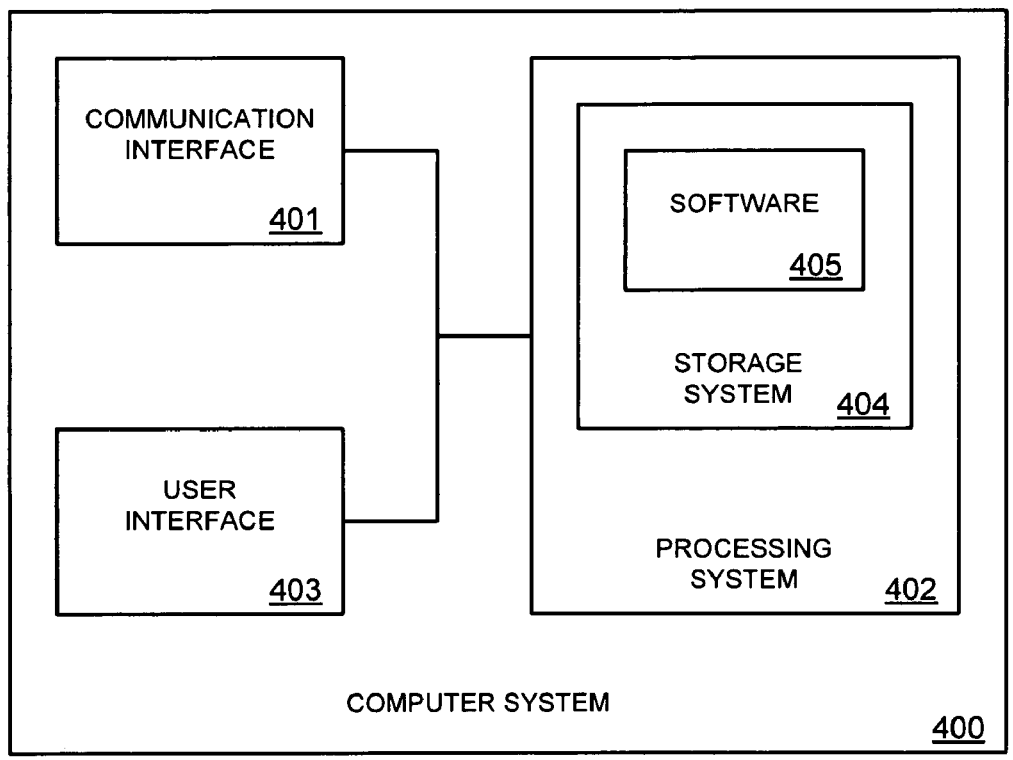
FIG. 4 is a block diagram illustrating a computer system configured to assign a static mobile internet protocol address to a mobile node.

FIG. 4 is a block diagram illustrating a computer system configured to assign a static mobile internet protocol address to a mobile node. Computer system 400 includes communication interface 401, processing system 402, and user interface 403. Processing system 402 includes storage system 404. Storage system 404 stores software 405. Processing system 402 is linked to communication interface 401 and user interface 403. Computer system 400 could be comprised of a programmed general-purpose computer, although those skilled in the art will appreciate that programmable or special purpose circuitry and equipment may be used. Computer system 400 may be distributed among multiple devices that together comprise elements 401-405.

Communication interface 401 could comprise a network interface, modem, port, transceiver, or some other communication device. Communication interface 401 may be distributed among multiple communication devices. Processing system 402 could comprise a computer microprocessor, logic circuit, or some other processing device. Processing system 402 may be distributed among multiple processing devices. User interface 403 could comprise a keyboard, mouse, voice recognition interface, microphone and speakers, graphical display, touch screen, or some other type of user device. User interface 403 may be distributed among multiple user devices. Storage system 404 could comprise a disk, tape, integrated circuit, server, or some other memory device. Storage system 404 may be distributed among multiple memory devices.

Processing system 402 retrieves and executes software 405 from storage system 404. Software 405 may comprise an operating system, utilities, drivers, networking software, and other software typically loaded onto a computer system. Software 405 could comprise an application program, firmware, or some other form of machine-readable processing instructions. When executed by processing system 402, software 405 directs processing system 402 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for assigning a static mobile internet protocol address to a mobile node by an access node, the method comprising:

receiving a mobile registration request message at the access node transferred from a mobile node;

sending an access request message to an authorization node, in response to the registration request;

receiving an access accept message from the authorization node in direct response to the access request message, wherein the access accept message comprises a static mobile internet protocol address associated with the mobile node;

sending an access registration request message to a mobile network internet node, wherein the access registration request message comprises the static mobile internet protocol address;

assigning the mobile node the static mobile internet protocol address at the mobile network internet node;

sending a mobile access registration request message associated with the mobile registration request message to the mobile network internet node at a time after the access registration request message has been sent;

receiving a mobile access registration reply message at the access node transferred from the mobile network internet node, wherein the mobile access registration reply message comprises the static mobile internet protocol address;

sending a mobile reply registration message to the mobile node transferred from the access node, wherein the mobile reply registration message comprises the static mobile internet protocol address;

wherein the time after the access registration request message has been sent is sufficient to ensure that the registration request arrives at the mobile network internet node after the mobile access registration request message;

wherein the assigning the mobile node the static mobile internet protocol address comprises creating a binding at the mobile network internet node, wherein the binding comprises the static mobile internet protocol address; and wherein the mobile node is a node in a radio access network.

2. The method of claim 1, wherein the access node is an access gateway.

3. The method of claim 1, wherein the authorization node is associated with an authentication, authorization, and accounting system.

4. The method of claim 1, wherein the mobile network internet node is configured to not respond to the mobile access registration request message when it arrives after the access registration request message.

5. A communication system for assigning a static mobile internet protocol address to a mobile node, the system comprising:

a radio network;
a mobile node coupled to the radio network;
an access node coupled to the radio network;
an authorization node coupled to the access node; and
a mobile network internet node coupled to the access node;
wherein the mobile node is configured to:
    send a mobile registration request message to the access node; and
    receive a mobile reply registration message from the access node;
wherein the access node is configured to:
    receive a mobile registration request message transferred from the mobile node;
    send an access request message to the authorization node, in response to the registration request;
    receive an access accept message from the authorization node in direct response to the access request message, wherein the access accept message comprises a static mobile internet protocol address associated with the mobile node;
    send an access registration request message to the mobile network internet node, wherein the access registration request message comprises the static mobile internet protocol address, and wherein the mobile network internet node is configured to assign the mobile node the static mobile internet protocol address;
    send a mobile access registration request message associated with the mobile registration request message to the mobile network internet node at a time after the access registration request message has been sent;
    receive a mobile access registration reply message transferred from the mobile network internet node, wherein the mobile access registration reply message comprises the static mobile internet protocol address; and
    send a mobile reply registration message to the mobile node, wherein the mobile reply registration message comprises the static mobile internet protocol address; and
wherein the authorization node is configured to:
    receive an access request message from the access node; and
    send an access accept message to the access node in direct response to the access request message; and
wherein the mobile network internet node is configured to:
    receive an access registration request message from the access node, wherein the access registration request message comprises the static mobile internet protocol address;
    assign the mobile node the static mobile internet protocol address; and
    send a mobile access registration reply message to the access node, wherein the mobile access registration reply message comprises the static mobile internet protocol address;
wherein the time after the access registration request message has been sent is sufficient to ensure that the registration request arrives at a home agent after the preemptive registration request;
wherein the assigning the mobile node the static mobile internet protocol address comprises creating a binding at the mobile network internet node, wherein the binding comprises the static mobile internet protocol address; and
wherein the mobile node is a node in a radio access network.

6. The communication system of claim 5, wherein the access node is an access gateway.

7. The communication system of claim 5, wherein the authorization node is associated with an authentication, authorization, and accounting system.

8. The communication system of claim 5, wherein the mobile network internet node is configured to not respond to the mobile access registration request message when it arrives after the access registration request message.

9. A method for assigning a static mobile internet protocol address to a mobile node by an access gateway, the method comprising:

receiving a mobile registration request message at the access gateway transferred from a mobile node in a radio access network;

sending an access request message to an authentication, authorization, and accounting system, in response to the registration request;

receiving an access accept message from the authentication, authorization, and accounting system in direct response to the access request message, wherein the access accept message comprises a static mobile internet protocol address associated with the mobile node;

sending an access registration request message to a mobile network internet node, wherein the access registration request message comprises the static mobile internet protocol address;

assigning the mobile node the static mobile internet protocol address at the mobile network internet node by creating a binding at the mobile network internet node, wherein the binding comprises the static mobile internet protocol address;

sending a mobile access registration request message associated with the mobile registration request message to the mobile network internet node at a time after the access registration request message has been sent, wherein the time after the access registration request message has been sent is sufficient to ensure that the registration request arrives at a home agent after the preemptive registration request, and wherein the mobile network internet node is configured to not respond to the mobile access registration request message when it arrives after the access registration request message;

receiving a mobile access registration reply message at the access node transferred from the mobile network internet node, wherein the mobile access registration reply message comprises the static mobile internet protocol address; and sending a mobile reply registration message to the mobile node transferred from the access gateway, wherein the mobile reply registration message comprises the static mobile internet protocol address.

10. The method of claim 9, wherein the radio access network is a Worldwide Interoperability for Microwave Access network.

* * * * *